US007000388B2

(12) United States Patent
Saitou et al.

(10) Patent No.: US 7,000,388 B2
(45) Date of Patent: Feb. 21, 2006

(54) HYDRAULIC CONTINUOUSLY VARIABLE TRANSMISSION

(75) Inventors: Mitsuru Saitou, Saitama (JP); Hideo Okuzaki, Saitama (JP); Kazuhiro Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/801,178

(22) Filed: Mar. 15, 2004

(65) Prior Publication Data

US 2004/0226294 A1    Nov. 18, 2004

(30) Foreign Application Priority Data

Mar. 31, 2003  (JP) .............................. 2003-096869

(51) Int. Cl.
  *F16H 39/14*  (2006.01)
(52) U.S. Cl. ...................................................... 60/489
(58) Field of Classification Search .................. 60/489, 60/487
  See application file for complete search history.

(56) References Cited

U.S. PATENT DOCUMENTS 3,132,486 A * 5/1964 Jonkers et al. ............... 60/489
3,680,312 A * 8/1972 Forster ......................... 60/489
3,698,189 A * 10/1972 Reimer ......................... 60/489
5,054,289 A * 10/1991 Nagatomo ................... 60/489
6,324,843 B1 * 12/2001 Yasuda et al. ................ 60/489

FOREIGN PATENT DOCUMENTS

JP        03089058      4/1991
JP        06042446      2/1994

* cited by examiner

*Primary Examiner*—Thomas E. Lazo
(74) *Attorney, Agent, or Firm*—Carrier, Blackman & Associates, P.C.; William D. Blackman; Joseph P. Carrier

(57) ABSTRACT

A hydraulic continuously variable transmission includes an axial plunger pump including a pump cylinder provided with pump plunger holes, and pump plungers fitted in the pump plunger holes. The transmission also includes an axial plunger motor including a motor cylinder provided with motor plunger holes, and motor plungers fitted in the motor plunger holes. A distribution valve of a closed hydraulic circuit is provided for connecting the axial plunger pump and the axial plunger motor to each other. Pump openings are provided at end portions of the pump plunger holes for discharging a hydraulic fluid pushed out by sliding movements of the pump plungers in the pump plunger holes. The pump openings are located opposite to end faces of the pump plungers, and the pump openings are smaller than the pump plunger holes and offset to the side of the rotational axis of the pump cylinder.

8 Claims, 10 Drawing Sheets

HYDRAULIC CONTINUOUSLY VARIABLE TRANSMISSION

CROSS-REFERENCE TO RELATED APPLICATIONS

The present invention claims priority under 35 USC 119 based on Japanese patent application No. 2003-096869, filed Mar. 31, 2003.

BACKGROUND OF THE INVENTION

1. Field of the Invention

The present invention relates to a hydraulic continuously variable transmission. More particularly, the present invention relates to a hydraulic continuously variable transmission having a structure in which hydraulic fluid, discharged from an axial plunger pump, is supplied to an axial plunger motor through a closed hydraulic circuit, to rotate the axial plunger motor.

2. Description of the Background Art

A variety of continuously variable transmissions are known. Some hydraulic continuously variable transmissions, including a hydraulic pump and a hydraulic motor in combination, have been known and put to practical use.

One example of a commercial hydraulic continuously variable transmission was sold by Honda during the year 2001, and marketed under the trademark "Hondamatic" on the 2001 Honda Fourtrax Foreman Rubicon™ TRX500 ATV.

Another example of a known a hydraulic continuously variable transmission is disclosed in Japanese Patent Laid-open No. Hei 6-42446 and Japanese Patent No. 2920772 proposed by the present applicant. The hydraulic continuously variable transmission disclosed in these patent documents includes a swash plate plunger pump, a swash plate plunger motor, and a closed hydraulic circuit for connecting a discharge port and a suction port of the swash plate plunger pump, respectively, to a suction port and a discharge port, respectively, of the swash plate plunger motor.

In the transmission disclosed in Japanese Patent Laid-open No. Hei 6-42446 and Japanese Patent No. 2920772, a pump swash plate member is driven by an engine, a pump cylinder and a motor cylinder are connected by an output shaft, a motor swash plate is restricted in rotation, and the motor swash plate angle can be variably adjusted.

Further in the hydraulic continuously variable transmission disclosed in Japanese Patent Laid-open No. Hei 6-42446 and Japanese Patent No. 2920772, the pump cylinder and the motor cylinder are connected to each other in a back-to-back relationship, and pump and motor distribution valves (distributor valves) are disposed at the connected portion, constituting a closed hydraulic circuit.

The pump and motor distribution valves are structured so that hydraulic fluid, coming from a pump plunger which is reciprocated in a pump cylinder according to rotation of the pump swash plate, is supplied into a motor cylinder chamber to push a motor plunger, and the motor plunger is moved in the axial direction in sliding contact with the motor swash plate, thereby rotating a motor cylinder.

Meanwhile, in the hydraulic continuously variable transmission including the axial plunger pump as mentioned above, when the hydraulic fluid is compressed by being pushed by the plunger slidingly moved in the plunger hole in the compressing direction, there is the problem that if air has been mixed into the hydraulic fluid, the compression efficiency of the pump is lowered because air is highly compressible. Hitherto, particularly, since a pump discharge opening for discharging the hydraulic fluid from the plunger hole when the plunger is moved in the compressing direction is smaller in diameter than the plunger hole, there has been the problem that air would remain at a stepped portion between an end portion of the plunger and the pump discharge opening, resulting in a lowering in compression efficiency.

Although the known devices have some utility for their intended purposes, there is still a need to provide an improved hydraulic continuously variable transmission. More particularly, there is a need for an improved hydraulic continuously variable transmission having a structure in which hydraulic fluid discharged from an axial plunger pump is supplied to an axial plunger motor through a closed hydraulic circuit to drive the axial plunger motor to rotate.

SUMMARY OF THE INVENTION

The present invention has been made in consideration of the above-mentioned problems. Accordingly, it is an object of the present invention to provide a hydraulic continuously variable transmission configured so that air present in pump plunger holes is easily discharged together with a hydraulic fluid, and so that air can be substantially prevented from remaining in the pump plunger holes.

In order to solve the above problems and to attain the above object, according to a selected illustrative embodiment of the present invention, a hydraulic continuously variable transmission is provided, including a casing and an axial plunger pump, including a pump cylinder rotatably supported on the casing. The pump cylinder is provided with a plurality of pump plunger holes, arranged in an annular layout surrounding the rotational axis thereof and penetrating therethrough in the axial direction, and is further provided with a plurality of pump plungers, slidably fitted in the pump plunger holes.

The hydraulic continuously variable transmission according to the illustrative embodiment hereof also includes an axial plunger motor, including a motor cylinder rotatably supported on the casing. The motor cylinder is provided with a plurality of motor plunger holes arranged in an annular layout surrounding the rotational axis thereof and penetrating therethrough in the axial direction, and is also provided with a plurality of motor plungers slidably fitted in the motor plunger holes.

The hydraulic continuously variable transmission according to the illustrative embodiment hereof also includes a closed hydraulic circuit for connecting a pump discharge port and a pump suction port of the axial plunger pump respectively to a motor suction port and a motor discharge port of the axial plunger motor.

In addition, pump discharge openings for discharging the hydraulic fluid pushed out attendant on sliding movements of the pump plungers in the pump plunger holes are provided at end portions of the pump plunger holes opposite end faces of the pump plungers, and the pump discharge openings are smaller than the pump plunger holes and offset to the side of the rotational axis of the pump cylinder.

In addition, it is preferable that the pump discharge openings are each formed in a circular shape, and the center axes of the circular shapes are offset to the side of the rotational axis of the pump cylinder relative to the center axes of the pump plunger holes, or that the pump discharge openings are each formed in an elliptic shape with a minor axis in a radial direction of the pump cylinder, and the center axes of the elliptic shapes are offset to the side of the rotational axis of the pump cylinder relative to the center axes of the pump plunger holes.

In the hydraulic continuously variable transmission configured as above, if air has been mixed into the pump plunger holes, due to the centrifugal force exerted in the condition where the pump cylinder is rotated, the hydraulic fluid having a high specific gravity is located on the outer diameter side in each pump plunger hole whereas the mixed air is located on the inner diameter side.

On the other hand, the pump discharge openings are offset to the side of the rotational axis of the pump cylinder (namely, to the inner diameter side), so that when the hydraulic fluid is compressed by being pushed by the plungers slidingly moved in the plunger holes in the compressing direction, the hydraulic fluid at the portions facing the pump discharge openings located on the inner diameter side, i.e., the hydraulic fluid at the portions where the mixed air is located, is discharged first.

As a result, the mixed air present in the pump plunger holes is discharged first, so that the air is prevented from remaining in the pump plunger holes, and the pump compression efficiency (volumetric efficiency) can be securely prevented from being lowered.

In addition, it is preferable that motor discharge openings for discharging the hydraulic fluid pushed out attendant on sliding movements of the motor plungers in the motor plunger holes are provided at end portions of the motor plunger holes opposite end faces of the motor plungers, and the motor discharge openings are smaller than the motor plunger holes and offset to the side of the rotational axis of the motor cylinder.

This makes it possible to substantially prevent air from remaining in the motor plunger holes, and to prevent motor compression efficiency from being lowered.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
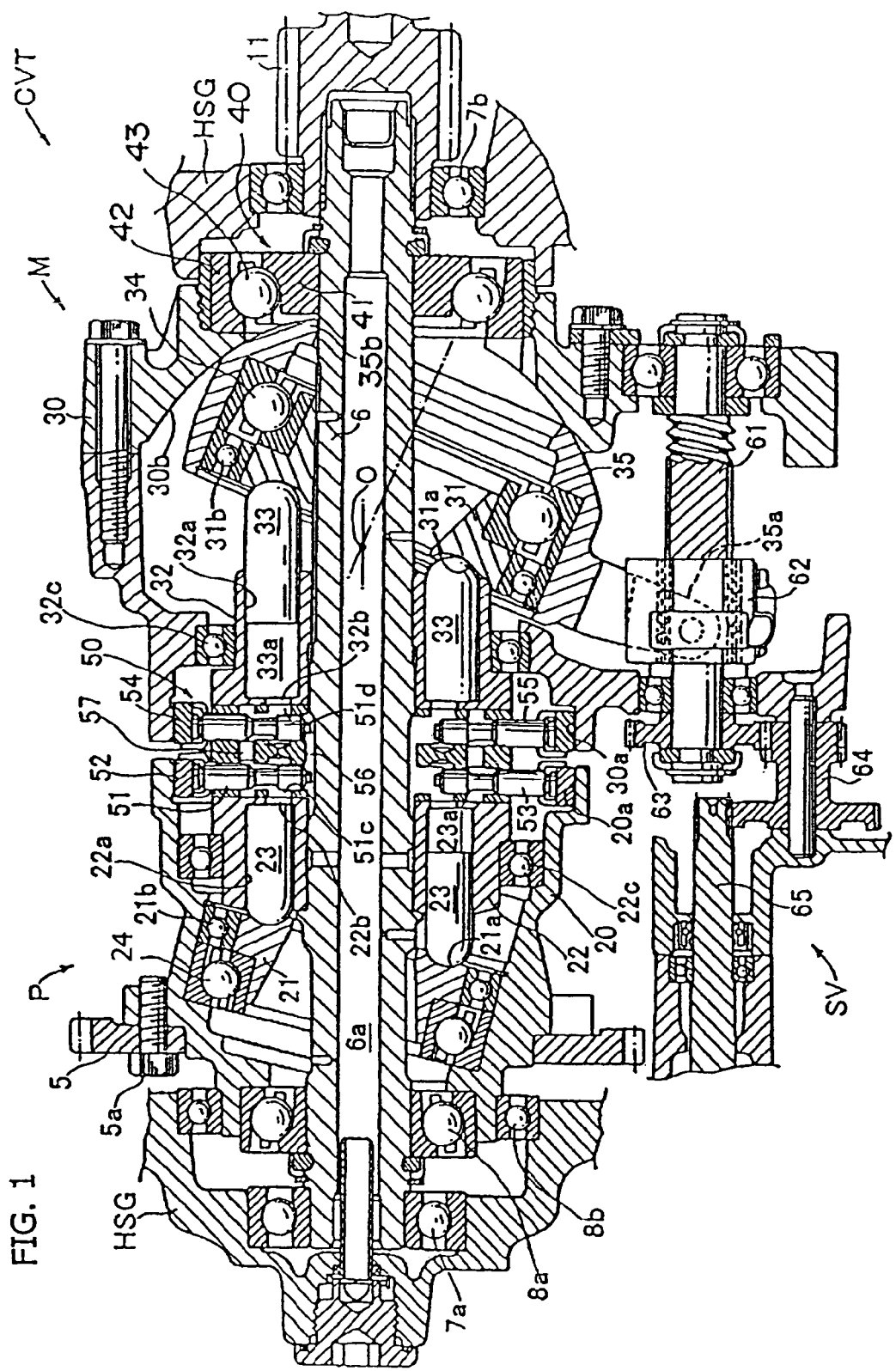
FIG. 1 is a cross-sectional view of a hydraulic continuously variable transmission according to a selected illustrative embodiment of the present invention.
Figure 2:
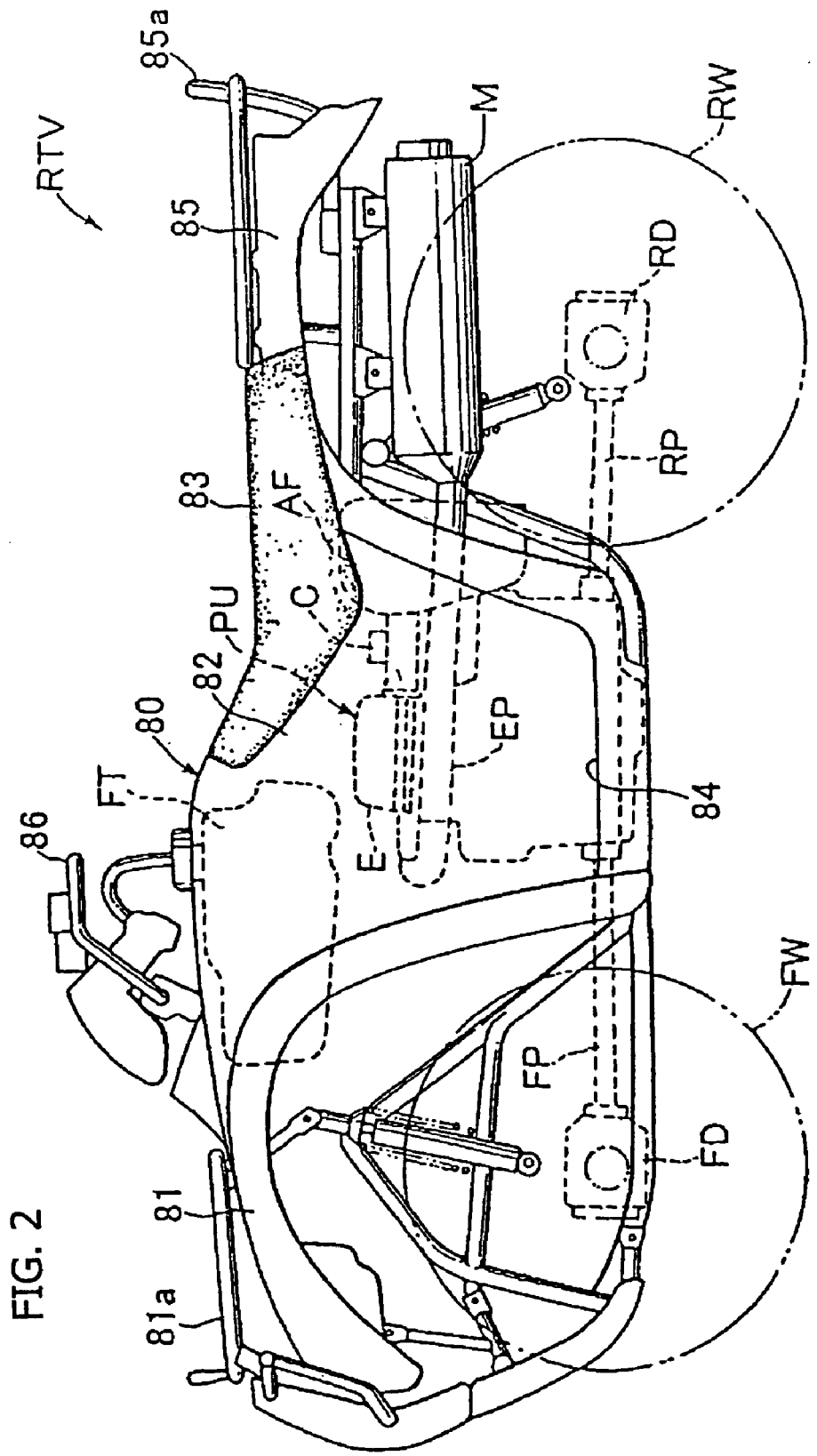
FIG. 2 is a side elevational view of an all-terrain vehicle including the above hydraulic continuously variable transmission according to an embodiment of the present invention.
Figure 3:
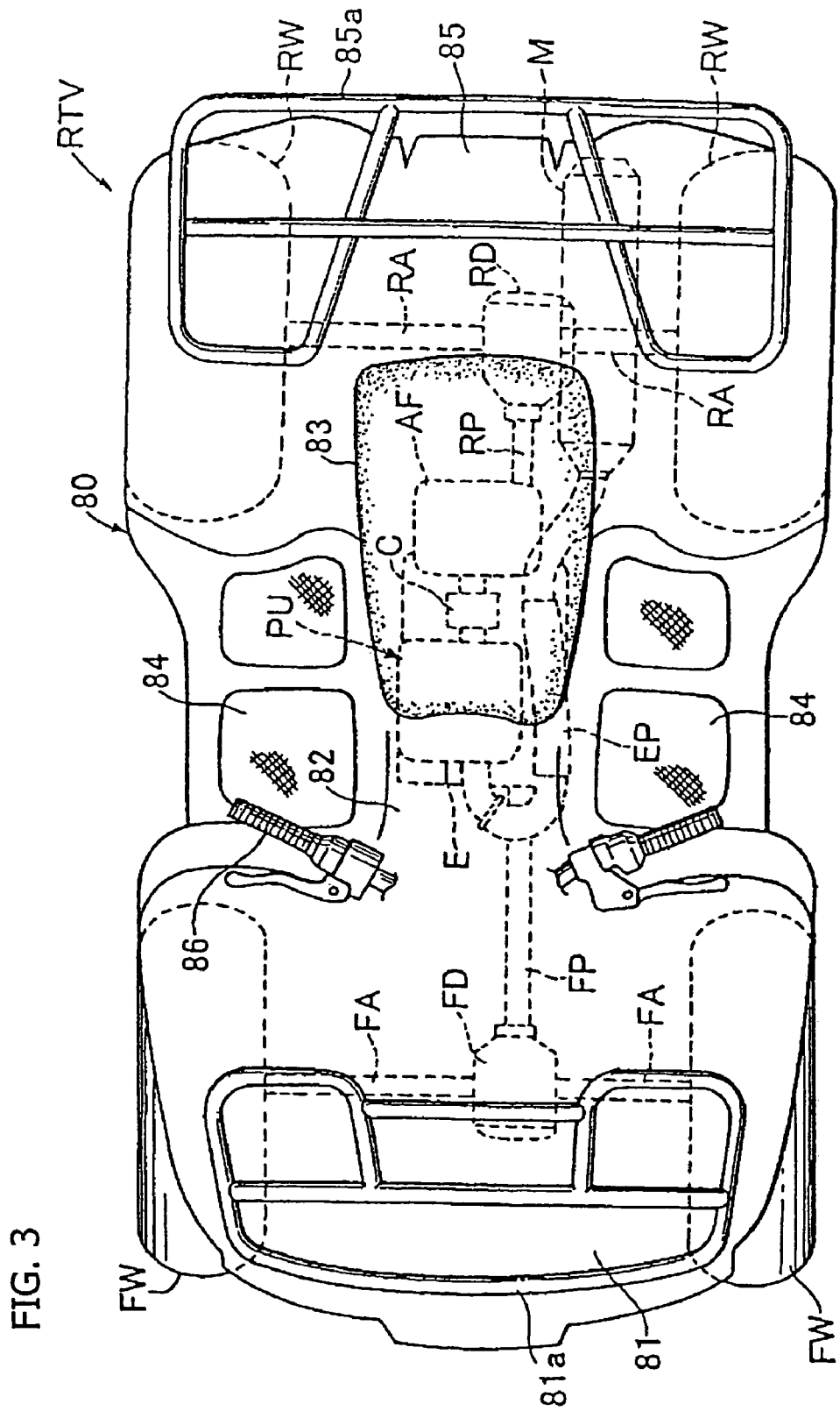
FIG. 3 is a top plan view of the off road vehicle including the hydraulic continuously variable transmission according to an embodiment of the present invention.
Figure 4:
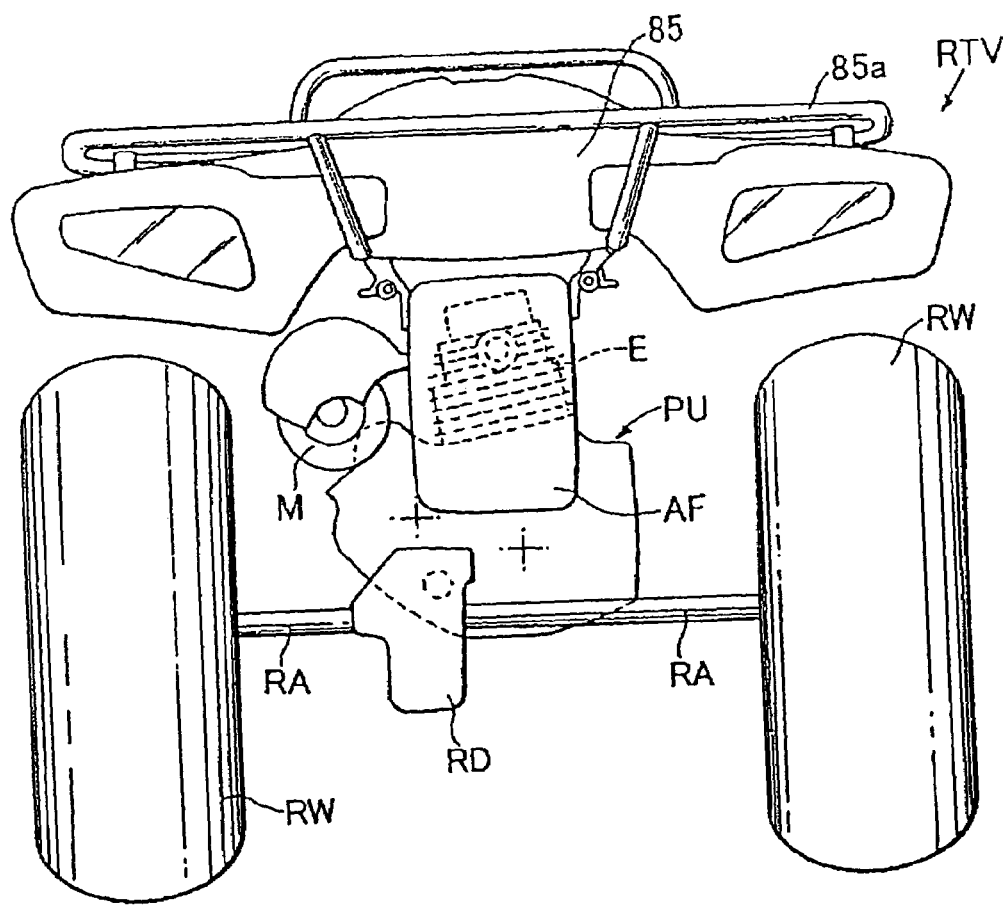
FIG. 4 is a back elevational view of the off road vehicle including the hydraulic continuously variable transmission according to an embodiment of the present invention.

Now, a selected illustrative embodiment of the present invention will be described with reference to the drawings. First, FIGS. 2 to 4 show an all-terrain vehicle, also referred to as a rugged terrain vehicle RTV suitable for off-road use, and including a hydraulic continuously variable transmission CVT (FIG. 1) according to the present invention.

The vehicle RTV includes a power unit PU incorporated in a vehicle body 80 having a frame structure therein. The vehicle RTV also includes left and right front and rear wheels FW and RW which are respectively driven upon receiving the output of the power unit PU.

In addition, the vehicle body 80 includes a front fender portion 81 including a front guard 81a and located at a vehicle body front portion, and a saddle portion 82 raised upwards and extending in the front-rear direction at a vehicle body central portion. The vehicle body 80 also has left and right step portions 84, 84 extending in the left-right direction at left and right lower portions of the saddle portion 82, and a rear fender portion 85 including a rear guard 85a and located at a vehicle body rear portion. The saddle portion 82 is provided with a seat 83 for seating a driver thereon. The driver thus seated on the seat 83 astride the saddle portion 82 puts his/her feet on the left and right step portions 84, and pivotally operates a steering handle 86, located on the front side and pivotally movable to the left and right sides. In addition, a fuel tank FT is disposed on the front side of the saddle portion 82, as shown in FIG. 1.

The power unit PU is disposed in the inside of the saddle portion 82, and the power unit PU includes an engine E, a main clutch CL, a hydraulic continuously variable transmission CVT, and a transmission gear train GT, as will be described later. The engine E is so constituted that a mixture gas formed by mixing air taken in through an air filter AF and a fuel fed from the fuel tank FT with each other in a carburetor C is taken into a cylinder and is combusted in the cylinder to thereby generate a rotational drive force.

In addition, an exhaust gas discharged upon the combustion in the engine E is discharged through an exhaust pipe EP and a muffler M.

The rotational drive force of the engine E is transmitted from a crankshaft with a speed change through the main clutch CL, the hydraulic continuously variable transmission CVT and the transmission gear train GT, and is transmitted to front and rear propeller shafts FP and RP. The front propeller shaft FP is connected to a front differential mechanism FD, and the rotational drive force output to the front propeller shaft FP is transmitted from the front differential mechanism FD to the left and right front wheels FW through left and right front axle shafts FA, to drive the front wheels FW. The rear propeller shaft RP is connected to a rear differential mechanism RD, and the rotational drive force output to the rear propeller shaft RP is transmitted from the rear differential mechanism RD to the left and right rear wheels RW through left and right rear axle shafts RA, to drive the rear wheels RW.

Figure 5:
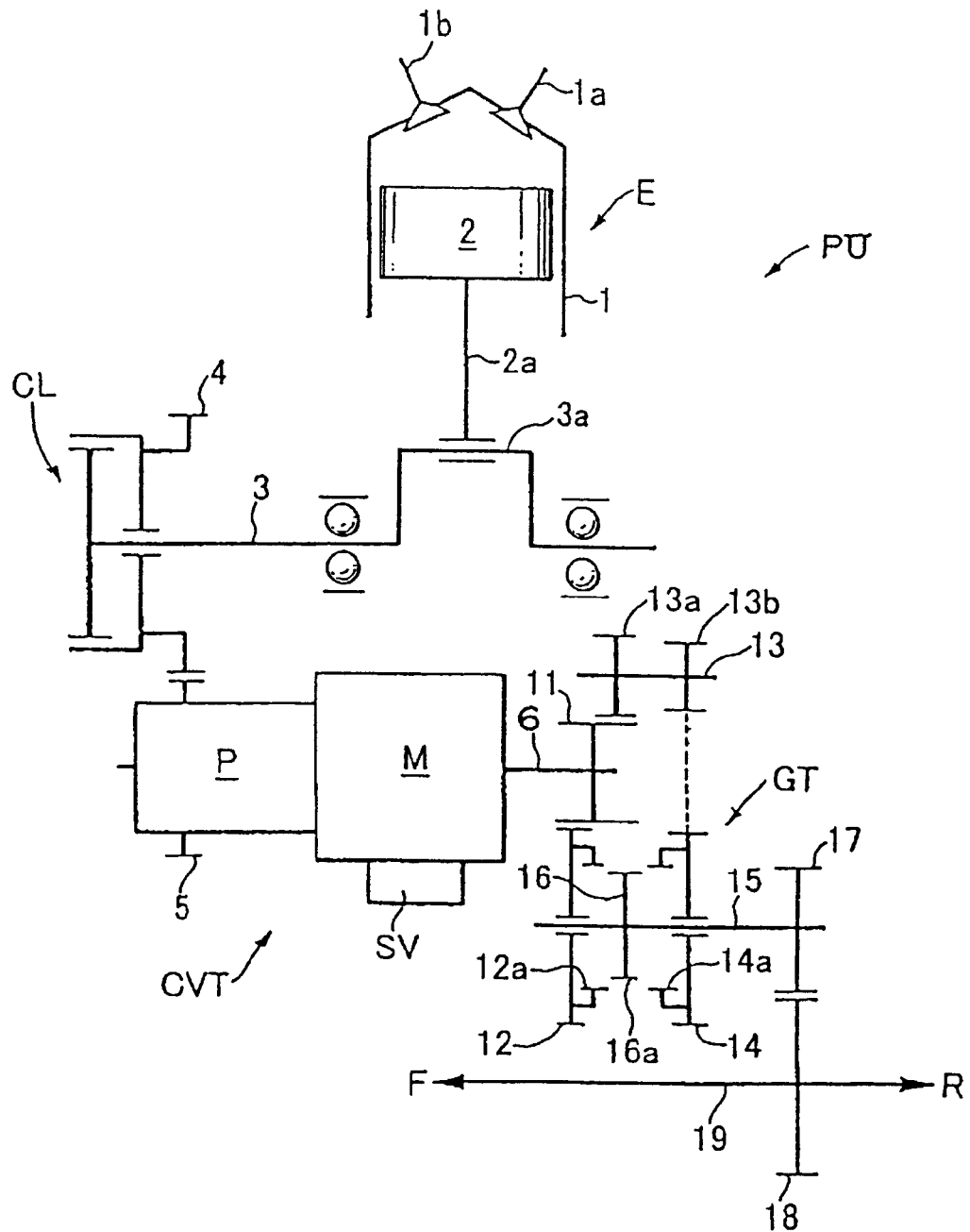
FIG. 5 is a schematic diagram showing the constitution of power transmission paths in a power unit including the hydraulic continuously variable transmission according to an embodiment of the present invention.

The power unit PU will now be described with reference to FIG. 5. The power unit PU includes the engine E for generating the rotational drive force, the main clutch CL for controlling the transmission of the rotational drive force, the hydraulic continuously variable transmission CVT for continuous speed change of the rotational drive force transmitted through the main clutch CL, and the transmission gear train GT for direction changeover and transmission of the output rotation of the hydraulic continuously variable transmission CVT.

In addition, the power unit PU is disposed below the saddle portion 82, with the engine crankshaft extending in the front-rear direction of the vehicle.

The engine E includes a piston 2 disposed in a cylinder 1 provided with intake and exhaust valves 1a and 1b in a head portion thereof. In the engine E, as mentioned above, air taken in through the air filter AF and the fuel fed from the fuel tank FT are mixed with each other in the carburetor C to form the mixture gas, which is sucked into a cylinder chamber by opening the intake valve 1a at a predetermined timing, and is combusted in the cylinder chamber to thereby reciprocate the piston 2, and the reciprocating motion of the piston 2 is transmitted through a connecting rod 2a to a crank portion 3a, whereby a crankshaft 3 is driven to rotate.

The main clutch CL is provided at an end portion of the crankshaft 3, to control the engagement and disengagement between an input drive gear 4 rotatably disposed on the crankshaft 3 and the crankshaft 3. Therefore, the rotational drive force of the crankshaft 3 is transmitted to the input drive gear 4 according to the engagement/disengagement control by the main clutch CL. In addition, the main clutch CL is composed, for example, of a centrifugal clutch.

The hydraulic continuously variable transmission CVT includes a swash plate plunger type hydraulic pump P and a swash plate plunger type hydraulic motor M. An input driven gear 5, connected to a pump casing of the swash plate plunger type hydraulic pump P, is meshed with the input drive gear 4. The rotational drive force of the engine E is transmitted to the input driven gear 5, whereby the pump casing is driven to rotate.

While details of the hydraulic continuously variable transmission CVT will be described later, the output torque, obtained through continuously adjustable speed change by the hydraulic continuously variable transmission CVT, is output to a transmission output shaft 6.

A transmission output gear 11 of the transmission gear train GT is connected to the transmission output shaft 6, and the rotation of the transmission output shaft 6 is transmitted from the transmission output gear 11 through the transmission gear train GT. The transmission gear train GT includes a counter shaft 15 and an idler shaft 13, which are disposed parallel to the transmission output shaft 6.

On the counter shaft 15, a forward-running gear 12 and a rearward-running gear 14 are rotatably disposed, and an output drive gear 17 is disposed in a connected state. On the other hand, a first idler gear 13a and a second idler gear 13b are disposed in a connected state on the idler shaft 13. The forward-running gear 12 is meshed with the transmission output gear 11, and the first idler gear 13a is also meshed with the transmission output gear 11. In addition, the second idler gear 13b is meshed with the rearward-running gear 14.

The forward-running gear 12 and the rearward-running gear 14 are provided respectively with internal clutch gears 12a and 14a, and a clutch sleeve 16 rotatable as one body with the counter shaft 15 and movable in the axial direction is provided between the forward-running gear 12 and the rearward-running gear 14. The clutch sleeve 16 is provided with an external clutch gear 16a at the outer circumference thereof, and is structured so that the clutch sleeve 16 can be moved in the axial direction to selectively mesh with the internal clutch gears 12a and 14a, whereby a dog tooth clutch is constituted. In addition, the clutch sleeve 16 is axially movable by the vehicle driver, to shift lever operations to the forward running side or to the rearward running side.

When a shift lever operation to the forward running side is performed by the driver, the clutch sleeve 16 is moved leftwards in the figure, the external clutch gear 16a is meshed with the internal clutch gear 12a, and the forward-running gear 12 is connected to the counter shaft 15. In this condition, therefore, the rotation of the transmission output gear 11 is transmitted from the forward-running gear 12 to the counter shaft 15, whereby the output drive gear 17 is driven to rotate.

On the other hand, when a shift lever operation to the rearward running side is performed by the driver, the clutch sleeve 16 is moved rightwards in the figure, the external clutch gear 16a is meshed with the internal clutch gear 14a, and the rearward-running gear 14 is connected to the counter shaft 15. In this condition, the rotation of the transmission output gear 11 is transmitted from the first idler gear 13a to the second idler gear 13b through the idler shaft 13, and is further transmitted from the second idler gear 13b to the counter shaft 15 through the rearward-running gear 14 meshed with the second idler gear 13b, whereby the output drive gear 17 is driven to rotate. In addition, the rotating direction of the output drive gear 17 in this instance is in the reverse direction (rearward-running direction) relative to that in the case of the shift lever operation to the forward running side.

The output drive gear 17 is meshed with an output driven gear 18 connected and attached to a drive shaft 19, so that the rotation of the output drive gear 17 is transmitted to the drive shaft 19 through the output driven gear 18. The front end of the drive shaft 19 is connected to the front propeller shaft FP, while the rear end of the drive shaft 19 is connected to the rear propeller shaft RP, and the rotational drive force transmitted to the drive shaft 19 is transmitted to the front and rear propeller shafts FP and RP, whereby the front and rear wheels FW and RW are driven, as mentioned above.

Next, the hydraulic continuously variable transmission CVT will be described, referring to FIG. 1 and FIGS. 6 to 8. The hydraulic continuously variable transmission CVT includes the swash plate plunger type hydraulic pump P and the swash plate plunger type hydraulic motor M, with the transmission output shaft 6 disposed to extend through the center thereof. In addition, the transmission output shaft 6 is rotatably supported by ball bearings 7a and 7b to be rotatable relative to a transmission housing HSG.

Pump Side Operation

The hydraulic pump P includes a pump casing 20 disposed on the transmission output shaft 6 to be coaxial with and rotatable relative to the transmission output shaft 6. The hydraulic pump P also includes a pump swash plate member 21 disposed inside of the pump casing 20, inclined at a predetermined angle with respect to the rotational center axis of the pump casing 20. The hydraulic pump P further includes a pump cylinder 22 disposed opposite to the pump swash plate member 21, and a plurality of pump plungers 23. The pump plungers 23 are slidably disposed in a plurality of pump plunger holes 22a, formed to extend in the axial direction in an annular layout surrounding the center axis of the pump cylinder 22.

The pump casing 20 is rotatably supported on the transmission output shaft 6 through a bearing 8a, and is supported by another bearing 8b to be rotatable relative to the transmission housing HSG. The pump swash plate member 21 is supported by bearings 21a and 21b to be rotatable about a swash plate axis, inclined at the predetermined angle relative to the pump casing 20. The pump cylinder 22 is supported by a bearing 22c to be coaxial with, and rotatable relative to the pump casing 20.

The input driven gear 5 is attached to the outer circumference of the pump casing 20 by bolts 5a. In addition, an outside end portion of each of the plungers 23 projects outwards to make contact and engagement with a swash plate surface 21a of the pump swash plate member 21. An inside end portion of each plunger 23, located in one of the pump plunger holes 22a, is opposed to a valve body 51 in a distribution valve 50 which will be described later, thereby forming a pump oil chamber 23a in the pump plunger hole 22a. In addition, pump openings 22b functioning as pump discharge and suction ports are provided at end portions of the pump plunger holes 22a.

When the input driven gear 5 is rotated as mentioned above, the pump casing 20 is also driven to rotate, and the pump swash plate member 21 disposed in the inside of the pump casing 20 is oscillated, based on the rotation of the pump casing 20. When the pump swash plate member 21 rotates in an oscillating manner, the pump plungers 23 are sequentially reciprocated in the pump plunger holes 22a according to the oscillating movement of the swash plate surface 21a, to alternately apply compressive and expansive forces to a hydraulic fluid inside the pump oil chambers 23a.

Motor Side Operation

The hydraulic motor M includes a motor casing 30 connected to and firmly held on the transmission housing HSG, and a motor pivot member 35 which is supported through sliding contact with a support spherical surface 30b formed on the inside surface of the motor casing 30. The motor pivot member 35 is supported to be pivotally movable about an oscillation center O extending in a perpendicular direction (in the direction perpendicular to the paper surface) relative to the center axis of the transmission output shaft 6.

The hydraulic motor M also includes a motor swash plate member 31 rotatably supported inside the motor pivot member 35 by bearings 31a and 31b, and a plurality of motor plungers 33 slidably disposed in a plurality of motor plunger holes 32a, and formed to extend in the axial direction in an annular layout surrounding the center axis of the motor cylinder 32. In addition, the motor cylinder 32 is rotatably supported, at an outer circumferential portion thereof, on the motor casing 30 through a bearing 32c.

An outside end portion of each of the motor plungers 33 projects outwards to make contact and engagement with a swash plate surface 31a of the motor swash plate member 31, and an inside end portion thereof located in the plunger hole 32a is opposed to the valve body 51, thereby forming a motor oil chamber 33a in the motor plunger hole 32a.

In addition, motor openings 32b functioning as motor discharge and suction ports are formed at end portions of the motor plunger holes 32a. An arm portion 35a formed by projecting an end portion of the motor pivot member 35 toward the outer diameter side projects radially outwards to be connected to a motor servo mechanism SV, a control for moving the arm portion 35a in the left-right direction in the figure is performed by the motor servo mechanism SV, and a control for pivotally moving the motor pivot member 35 about the oscillation center O is performed.

When the motor pivot member 35 is thus moved, the motor swash plate member 31 rotatably supported inside the motor pivot member 35 is also moved together therewith, with the result of a change in the swash plate angle.

The distribution valve 50 is disposed between the pump cylinder 22 and the motor cylinder 32. The valve body 51 of the distribution valve 50 is clamped between the pump cylinder 22 and the motor cylinder 32 to achieve integral connection, and is also connected to the transmission output shaft 6. Therefore, the pump cylinder 22, the distribution valve 50, the motor cylinder 32, and the transmission output shaft 6 are rotated as one body.

Figure 7:
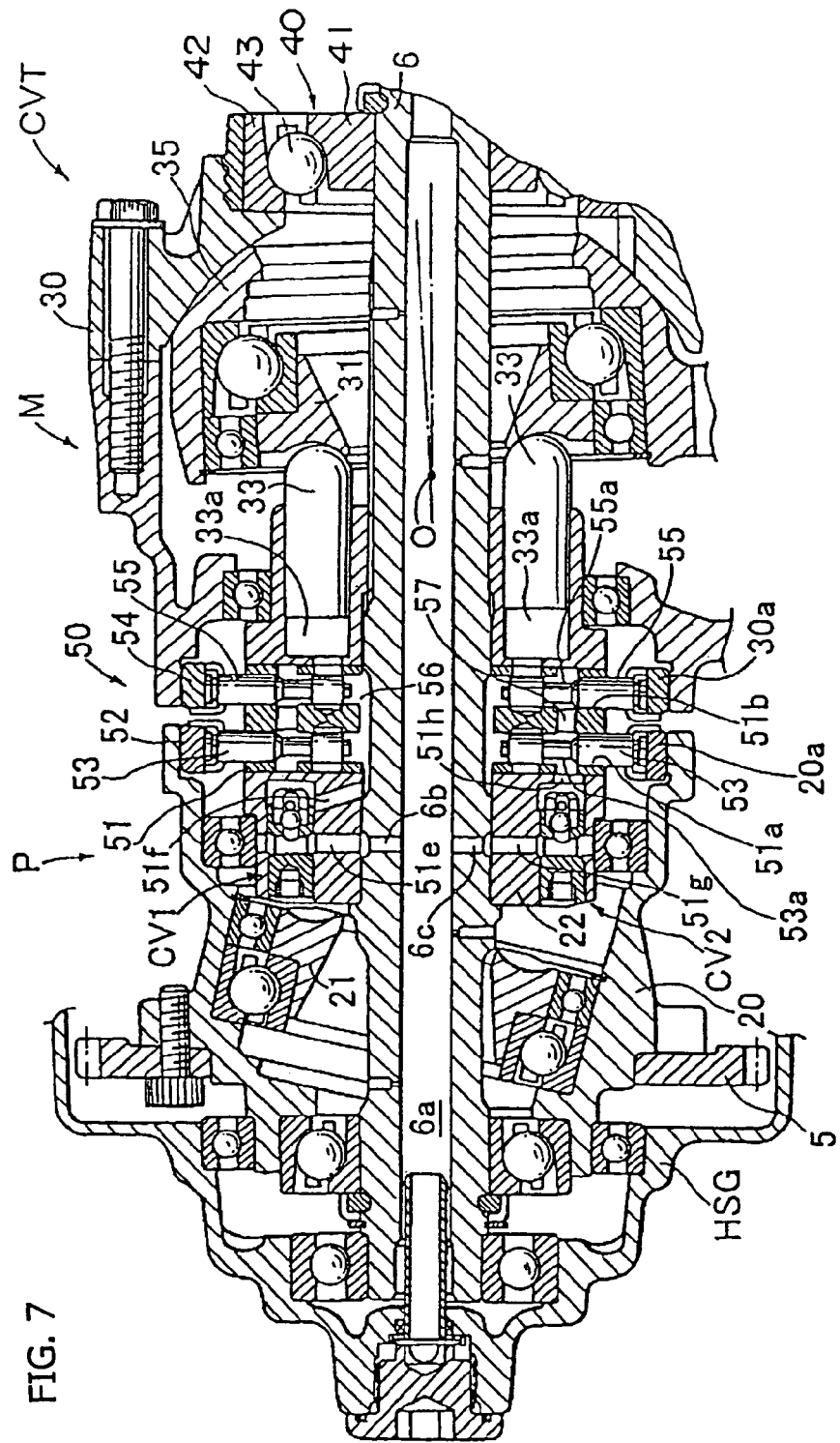
FIG. 7 is a cross-sectional view of the hydraulic continuously variable transmission according to an embodiment of the present invention.

As symbols clearly shown particularly in FIG. 7, a plurality of pump-side spool holes 51a and a plurality of motor-side spool holes 51b extending in the radial directions and laid out at regular intervals along the circumferential direction are provided, in two rows, in the valve body 51 of the distribution valve 50. Pump-side spools 53 are slidably disposed in the pump-side spool holes 51a, and motor-side spools 55 are slidably disposed in the motor-side spool holes 51b.

The pump-side spool holes 51a are formed in correspondence with the pump plunger holes 22a, and the valve body 51 is provided with a plurality of pump-side communication passages 51c for communication between the corresponding pairs of the pump openings 22b (the pump oil chambers 23a) and the pump-side spool holes 51a. The motor-side spool holes 51b are formed in correspondence with the motor plunger holes 32a, and the valve body 51 is provided with a plurality of motor-side communication passages 51d for communication between the corresponding pairs of the motor openings 32b (the motor oil chambers 33a) and the motor-side spool holes 51b (see FIG. 1).

In the distribution valve 50, further, a pump-side cam ring 52 is disposed at a position surrounding the outer circumferential end portions of the pump-side spools 53, and a motor-side cam ring 54 is disposed at a position surrounding the outer circumferential end portion of the motor-side spools 55.

The pump-side cam ring 52 is mounted inside an eccentric inner circumferential surface 20a formed on the tip end inside surface of the pump casing 20 with an eccentricity from the rotational center axis of the pump casing 20, and is rotated as one body with the pump casing 20.

The motor-side cam ring 54 is mounted inside an eccentric inner circumferential surface 30a formed on the tip end inside surface of the motor casing 30 with an eccentricity from the rotational center axis of the motor cylinder 32.

In addition, the outer circumferential ends of the pump-side spools 53 are relatively rotatably engaged and stopped on the inner circumferential surface of the pump-side cam ring 52, and the outer circumferential ends of the motor-side spools 55 are relatively rotatably engaged and stopped on the inner circumferential surface of the motor-side cam ring 54.

An inside passage 56 is formed between the inner circumferential surface of the valve body 51 and the outer circumferential surface of the transmission output shaft 6, and inner circumferential end portions of the pump-side spool holes 51a and the motor-side spool holes 51b are communicated with the inside passage 56. In addition, the valve body 51 is provided therein with an outside passage 57 for communication between the pump-side spool holes 51a and the motor-side spool holes 51b.

Here, the operations of the distribution valve 50 constituted as above will be described. When the drive force of the engine E is transmitted to the input driven gear 5 and the pump casing 20 is driven to rotate, the pump swash plate member 21 is oscillated according to the rotation.

Therefore, the pump plungers 23 in contact and engagement with the swash plate surface 21a of the pump swash plate member 21 are reciprocated in the axial direction in the pump plunger holes 22a, the hydraulic fluid is discharged from the pump oil chambers 23a through the pump openings 22b according to the inward movements of the pump plungers 23, and the hydraulic fluid is sucked into the pump chambers 23a through the pump openings 22b according to the outward movements of the pump plungers 23.

In this instance, the pump-side cam ring 52 attached to an end portion of the pump casing 20 is rotated together with the pump casing 20, and, since the pump-side cam ring 52 is mounted with an eccentricity relative to the rotational center of the pump casing 20, the pump-side spools 53 are reciprocated in the radial direction inside the pump-side spool holes 51a according to the rotation of the pump-side cam ring 52.

In the reciprocation of the pump-side spools 53, when the pump-side spool 53 is moved toward the inner diameter side as shown in the upper half of FIG. 1, the pump-side communication passage 51c and the outside passage 57 are communicated with each other through a spool groove 53a; on the other hand, when the pump-side spool 53 is moved toward the outer diameter side as shown in the lower half of FIG. 1, the pump-side passage 51c and the inside passage 56 are communicated with each other through the spool groove 53a.

Here, the eccentric mount position is so set that, when the swash plate member 21 is oscillated by the rotation of the pump casing 20 and the pump plungers 23 are thereby reciprocated, in a half rotation of the pump casing 20 in which the pump plunger 23 is moved from a most pushed-outward position (referred to as the bottom dead center) to a most pushed-inward position (referred to as the top dead center), the pump-side cam ring 52 moves the pump-side spool 53 toward the inner diameter side, and, in a half rotation of the pump casing 20 in which the pump plunger 23 is moved from the top dead center to the bottom dead center, the pump-side cam ring 52 moves the pump-side spool 53 toward the outer diameter side.

As a result, when the pump plunger 23 is moved from the bottom dead center to the top dead center attendant on the rotation of the pump casing 20 and the hydraulic fluid in the pump oil chamber 23a is thereby discharged through the pump opening 22b, the hydraulic fluid is fed out through the pump-side communication passage 51c into the outside passage 57.

On the other hand, when the pump plunger 23 is moved from the top dead center to the bottom dead center attendant on the rotation of the pump casing 20, the hydraulic fluid in the inside passage 56 is sucked into the pump oil chamber 23a through the pump-side communication passage 51c and the pump opening 22b. As seen from this, when the pump casing 20 is driven to rotate, the hydraulic fluid discharged from the hydraulic pump P is supplied into the outside passage 57, and the hydraulic fluid is sucked from the inside passage 56 into the hydraulic pump P.

On the other hand, the motor-side cam ring 54 attached to an end portion of the motor casing 30 is also mounted with an eccentricity relative to the rotational center of the motor casing 30, so that, when the motor cylinder 32 is rotated, the motor-side spools 55 are reciprocated in the radial direction inside the motor-side spool holes 51b according to the rotation. In the reciprocation of the motor-side spools 55, when the motor-side spool 55 is moved toward the inner diameter side as shown in the upper half of FIG. 1, the motor-side communication passage 51d and the outside passage 57 are communicated with each other through a spool groove 55a; on the other hand, when the motor-side spool 55 is moved toward the outer diameter side as shown in the lower half of FIG. 1, the motor-side passage 51d and the inside passage 56 are communicated with each other through a spool groove 55a.

Here, as has been described above, the hydraulic fluid discharged from the hydraulic pump P is fed into the outside passage 57, and the hydraulic fluid is supplied from the motor-side communication passage 51d into the motor oil chambers 33a through the motor openings 32b, whereby the motor plungers 33 are pushed outwards in the axial direction. Outside end portions of the motor plungers 33 thus receiving the axially outward pushing forces are in sliding contact with the portion ranging from the top dead center to the bottom dead center of the motor swash plate member 31 in the condition where the motor pivot member 35 is pivotally moved as shown in FIG. 1, and the motor cylinder 32 is driven to rotate so that the motor plungers 33 are each moved along the motor swash plate member 31 from the top dead center to the bottom dead center by the axially outward pushing force.

In order to achieve such a rotational driving, the eccentric mount position of the motor-side cam ring 54 is so set that, when the motor plungers 33 are each reciprocated along the inclination of the motor swash plate member 31 attendant on the rotation of the motor cylinder 32, in a half rotation of the motor cylinder 32 in which the motor plunger 33 is moved from a most pushed-outward position (bottom dead center) to a most pushed-inward position (top dead center), the motor-side cam ring 54 moves the motor-side spool 55 toward the outer diameter side, and, in a half rotation of the motor cylinder 32 in which the motor plunger 33 is moved from the top dead center to the bottom dead center, the motor-side cam ring 54 moves the motor-side spool 55 toward the outer diameter side.

When the motor cylinder 32 is thus driven to rotate, the motor plunger 33 is pushed and moved inwards when moving along the motor swash plate member 31 from the bottom dead center to the top dead center, whereby the hydraulic fluid in the motor oil chamber 33a is fed from the motor opening 32b into the inside passage 56 through the motor-side communication passage 51d. The hydraulic fluid thus fed into the inside passage 56 is sucked into the pump oil chamber 23a through the pump-side communication passage 51c and the pump opening 22b.

As is seen from the above description, when the pump casing 20 is driven to rotate by receiving the rotational drive force of the engine E, the hydraulic fluid is discharged from the hydraulic pump P into the outside passage 57, and is fed to the hydraulic motor M, to rotate the motor cylinder. The hydraulic fluid, having driven the motor cylinder 32, is fed into the inside passage 56, and is then sucked from the inside passage 56 into the hydraulic pump P. Thus, the closed hydraulic circuit for connecting the hydraulic pump P and the hydraulic motor M to each other includes the distribution valve 50. The hydraulic fluid discharged from the hydraulic pump P according to the rotation of the hydraulic pump P is fed through the closed hydraulic circuit to the hydraulic motor M, to drive the hydraulic motor M to rotate, and the hydraulic fluid discharged after driving the hydraulic motor M is returned through the closed hydraulic circuit to the hydraulic pump P.

In this case, since the pump cylinder 22 and the motor cylinder 32 are connected to the transmission output shaft 6 and are rotated as one body with the latter, when the motor cylinder 32 is driven to rotate as above-mentioned, the pump cylinder 22 is also rotated together, and the relative rotating speed of the pump casing 20 and the pump cylinder 22 is reduced. Therefore, the relationship between the rotating speed Ni of the pump casing 20 and the rotating speed No of the transmission output shaft 6 (namely, the rotating speed of the pump cylinder 22 and the motor cylinder 32) is as represented by the following equation (1) in relation to the pump volume Vp and the motor volume Vm.

$$Vp \cdot (Ni - No) = Vm \cdot No \qquad \text{Equation 1}$$

The motor volume Vm can be continuously adjustably varied by a control for pivotally moving the motor pivot member 35 by the motor servo mechanism SV. Therefore, when it is assumed that the rotating speed Ni of the pump swash plate member 21 in the above equation (1) is constant, a control for continuously adjustably varying the motor volume Vm causes a speed change control for a continuously adjustable speed change of the rotation of the transmission output shaft 6.

When a control for reducing the pivot angle of the motor pivot member 35 is performed, the motor volume Vm is reduced, and, when it is assumed that the pump volume Vp is constant and the rotating speed Ni of the pump swash plate member 21 is constant in the relationship of the above equation (1), there results a control for an increase in speed for causing the rotation of the transmission output shaft 6 to approach the rotating speed Ni of the pump swash plate member 21, i.e., a continuously adjustable speed change control to a top speed change stage. At the time when the motor swash plate angle becomes zero, i.e., when the motor swash plate becomes upright, a speed change ratio of Ni=No (top speed change ratio) is theoretically attained, and a hydraulic lock condition results in which the pump casing 20 is rotated as one body with the pump cylinder 22, the motor cylinder 32 and the transmission output shaft 6, to achieve a mechanical power transmission.

Figure 6:
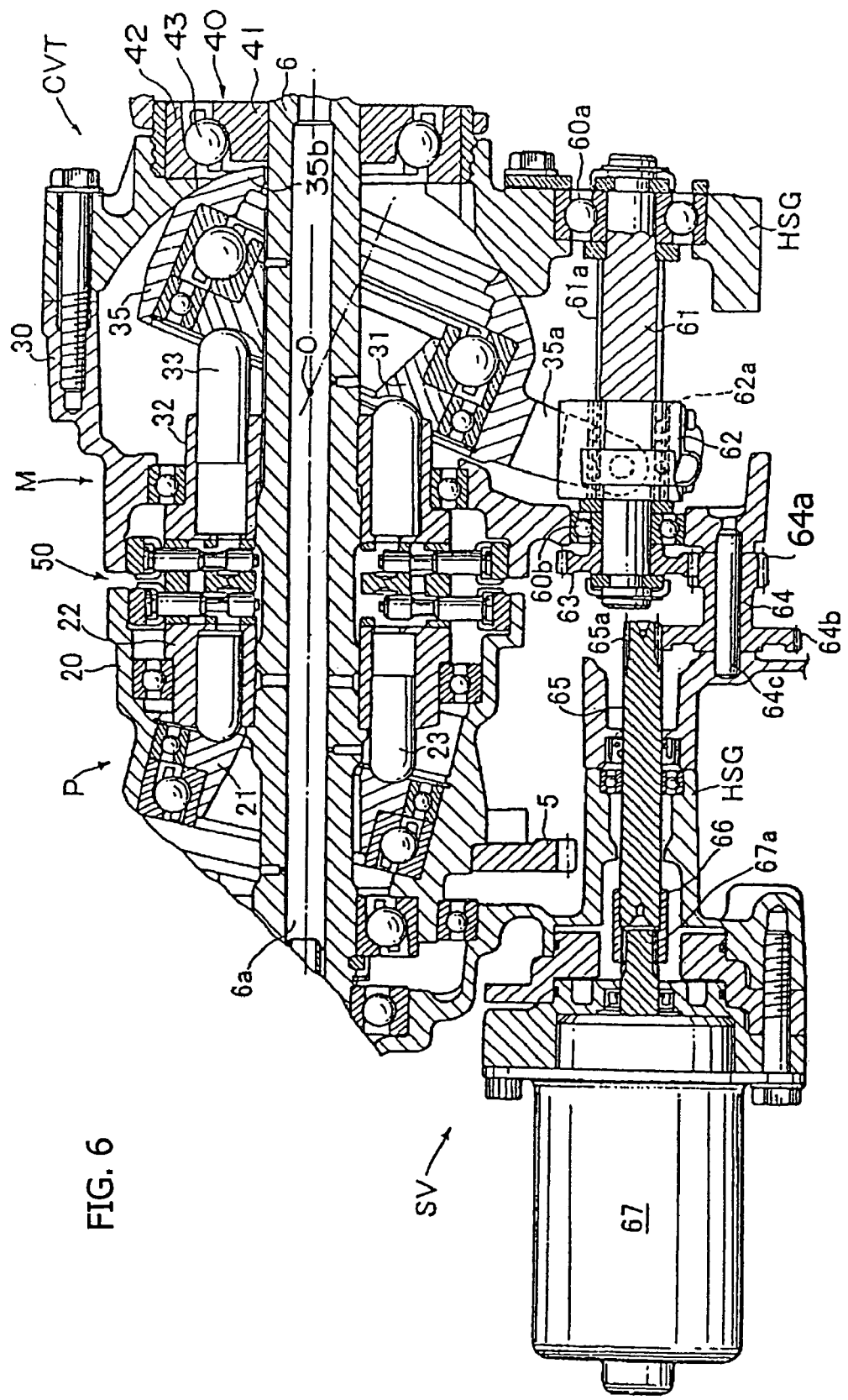
FIG. 6 is a cross-sectional view of the hydraulic continuously variable transmission according to an embodiment of the present invention.

While the control for continuously adjustably varying the motor volume as above-mentioned is performed by a variable control of the motor swash plate angle through pivotally moving the motor pivot member 35, the motor servo mechanism SV for pivotally moving the motor pivot member 35 in this manner will be described below referring principally to FIG. 6.

The motor servo mechanism SV includes a ball screw shaft 61 located in the vicinity of the arm portion 35a of the motor pivot member 35, extending in parallel to the transmission output shaft 6 and supported by bearings 60a and 60b to be rotatable relative to the transmission housing HSG, and a ball nut 62 disposed in screw engagement with a male screw 61a formed at the outer circumference of the ball screw shaft 61.

In addition, a ball female screw 62a composed of a multiplicity of balls held arranged in a screw form by a cage is provided at the inner circumference of the ball nut 62, and the male screw 61a is screw-engaged with the ball female screw 62a. The ball nut 62 is connected to the arm portion 35a of the motor pivot member 35, and, when the ball screw shaft 61 is driven to rotate, the ball nut 62 is moved in the left-right direction on the shaft 61, whereby the motor pivot member 35 is pivotally moved.

In order to drive the ball screw shaft 61 to rotate in this manner, a swash plate control motor (electric motor) 67 is attached to the outside surface of the transmission housing HSG. A drive shaft 67a of the swash plate control motor 67 is connected to a spacer shaft 65 through a coupling 66. The spacer shaft 65 extends inside the transmission housing HSG in parallel to the transmission output shaft 6, extends beyond the outer circumference of the input driven gear 5 to the vicinity of an end portion of the ball screw shaft 61, and is rotatably supported on the transmission housing HSG.

On the other hand, an idle shaft 64c extending in parallel to the spacer shaft 65 is supported on the transmission housing HSG, and an idle gear member 64 is rotatably mounted on the idle shaft 64c.

The spacer shaft 65 is provided at its tip end with a first gear 65a, which is meshed with a second gear 64b integrally formed on the idle gear member 64. In addition, a third gear 64a integrally formed on the idle gear member 64 is meshed with a fourth gear 63 mounted to an end portion of the ball screw shaft 61. Therefore, when a rotational drive control of the swash plate control motor 67 is performed and the drive shaft 67a is thereby rotated, the rotation is transmitted through the idle gear member 64 to the fourth gear member 63, to drive the ball screw shaft 61 to rotate, whereby the ball nut 62 is moved on the shaft 61 in the left-right direction, and a control for pivotally moving the motor pivot member 35 is performed.

Meanwhile, when the oil flows through the closed hydraulic circuit and the hydraulic force is transmitted between the hydraulic pump P and the hydraulic motor M as described above, there arise leakage of the oil from the closed hydraulic circuit and leakage of the oil from fitting portions between the pump and motor plunger holes 22a, 32a and the pump and motor plungers 23, 33. In view of this, the transmission output shaft 6 is provided with a charge oil supply hole 6a extending in the axial direction, and, as shown in FIG. 7, the charge oil supply hole 6a is connected to a first check valve CV1 disposed in the pump cylinder 22 through an oil passage 6b formed in the transmission output shaft 6 and an oil passage 51e formed in the pump cylinder 22, and connected further from the first check valve CV1 to the inside passage 56 through an oil passage 51f. Therefore, a charge oil supplied from a charge oil supply source (not shown) into the charge oil supply hole 6a is supplied through the first check valve CV1 into the inside passage 56, as required.

In addition, the charge oil supply hole 6a is connected to a second check valve CV2 disposed in the pump cylinder 22 through an oil passage 6c formed in the transmission output shaft 6 and an oil passage 51g formed in the pump cylinder 22, and is further connected from the second check valve CV2 to the outside passage 57 through an oil passage 51h. Therefore, the charge oil supplied into the charge oil supply hole 6a is supplied through the second check valve CV2 into the outside passage 57, as required.

As seen from the above description of the operations of the hydraulic pump P and the hydraulic motor M, in a normal running condition, i.e., in the condition where the hydraulic motor M is driven to rotate under the supply of the hydraulic fluid from the hydraulic pump P, a higher pressure is present in the outside passage 57 and a lower pressure is present in the inside passage 56, so that the charge oil is supplied into the inside passage 56 through the first check valve CV1. However, in the condition where the vehicle is running under an engine brake action, a lower pressure is present in the outside passage 57 and a higher pressure is present in the inside passage 56, so that the charge oil is supplied into the outside passage 57 through the second check valve CV2.

Figure 8:
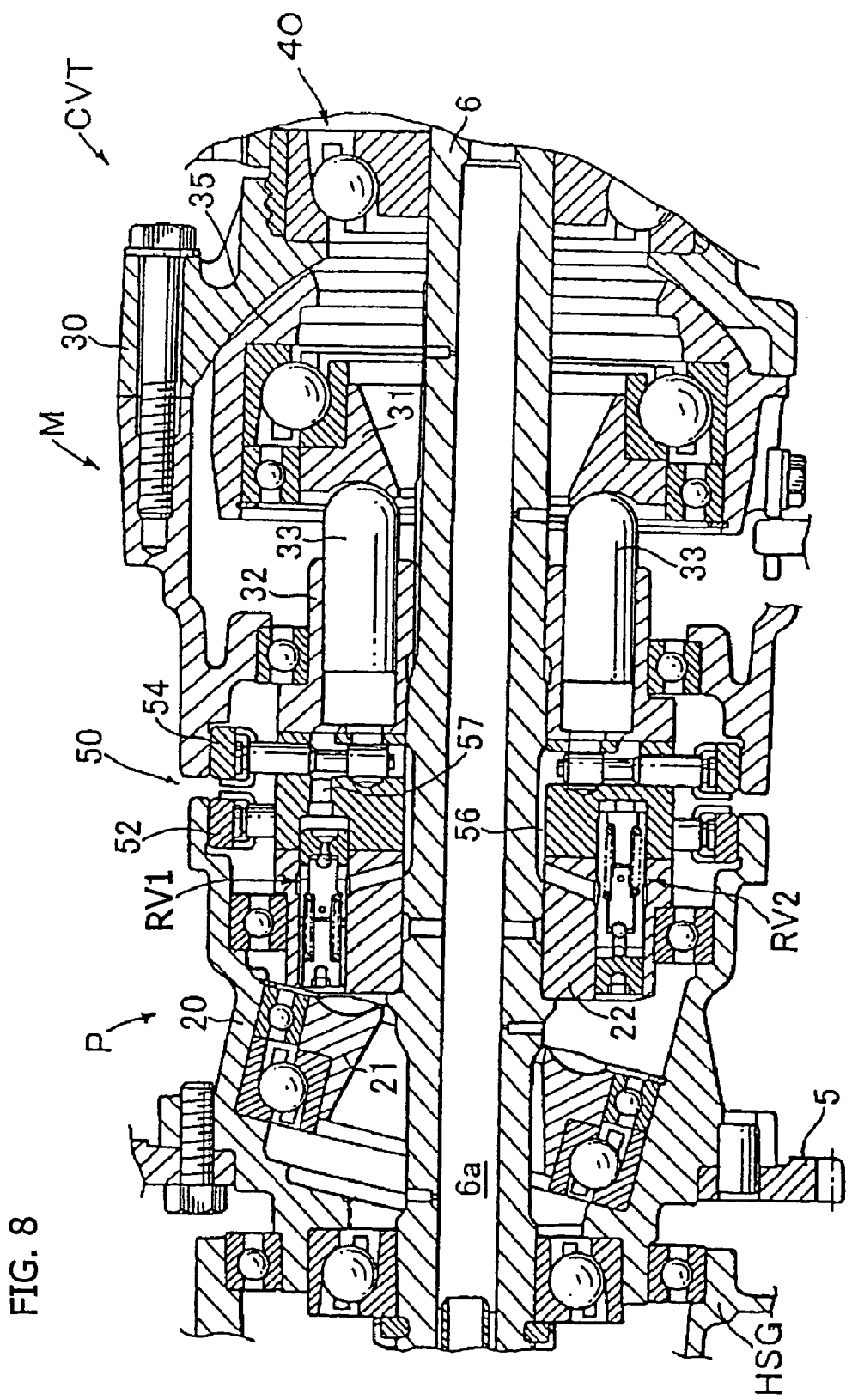
FIG. 8 is a cross-sectional view of the hydraulic continuously variable transmission according to an embodiment of the present invention.

As shown in FIG. 8, first and second relief valves RV1 and RV2 are also disposed in the pump cylinder 22. First, the first relief valve RV1 is disposed in the state of connecting the outside passage 57 and the inside passage 56 to each other, and, when the oil pressure in the outside passage 57 reaches or exceeds a predetermined pressure, the first relief valve RV opens to relieve the oil pressure into the inside passage 56, thereby preventing the oil pressure in the outside passage 57 from becoming excessively high. The second relief valve RV2 is disposed in the state of connecting the inside passage 56 and the outside passage 57 to each other, and, when the oil pressure in the inside passage 56 reaches or exceeds a predetermined pressure, the second relief valve RV2 opens to relieve the oil pressure into the outside passage 57, thereby preventing the oil pressure in the inside passage 56 from becoming excessively high.

Figure 9:
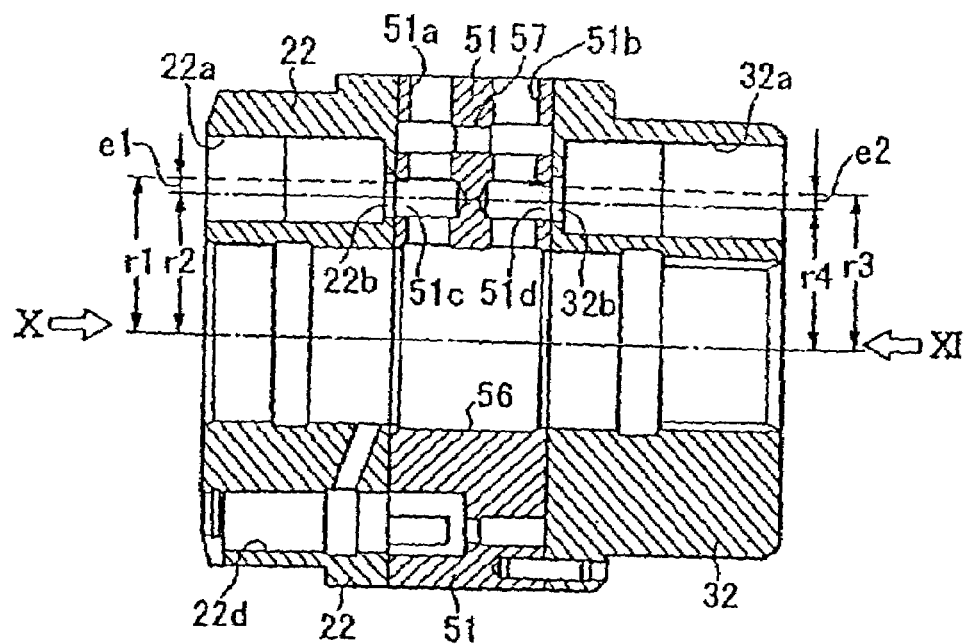
FIG. 9 is a sectional view of a pump cylinder, a distribution valve body, and a motor cylinder of the hydraulic continuously variable transmission according to an embodiment of the present invention.
Figure 10:
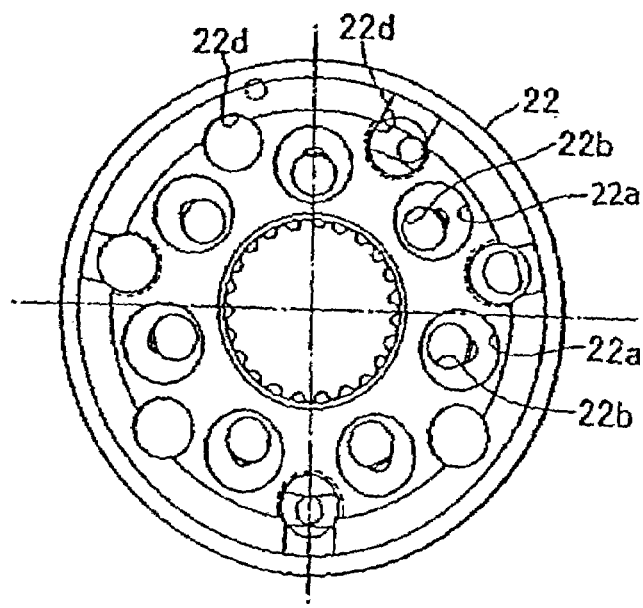
FIG. 10 is a side view of a pump cylinder which is a component of the hydraulic continuously variable transmission according to an embodiment of the present invention.
Figure 11:
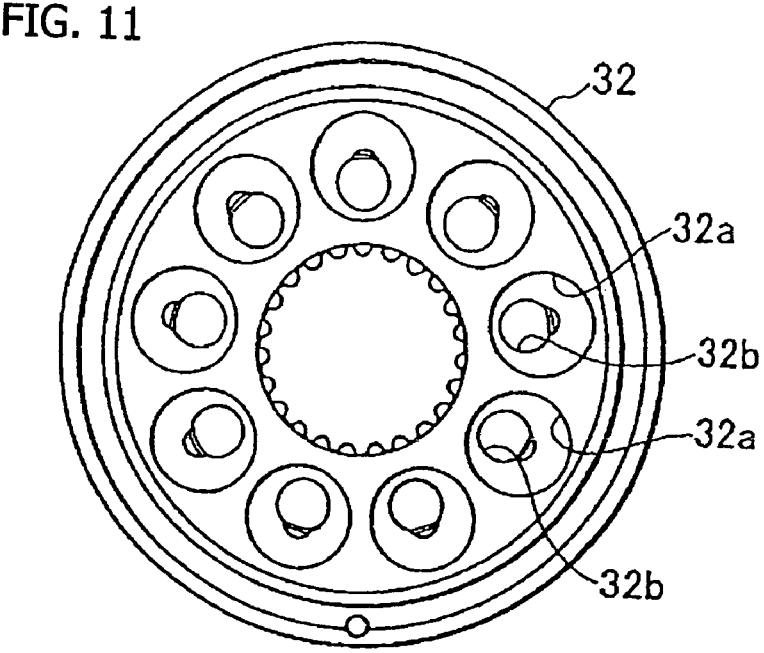
FIG. 11 is a side view of a motor cylinder which is another component of the hydraulic continuously variable transmission according to an embodiment of the present invention.

In the hydraulic continuously variable transmission CVT constituted as described above, the pump openings 22b provided in correspondence with the pump plunger holes 22a in the pump cylinder 22, the pump-side communication passage 51c and the motor-side communication passage 51d formed in the valve body 51, and the motor openings 32b provided in correspondence with the motor plunger holes 32a in the motor cylinder 32 will be described referring to FIGS. 9 to 11.

The pump openings 22b function as discharge and suction ports of the hydraulic pump P. As shown in FIGS. 9 and 10, each of the pump openings 22b is formed as a substantially cylindrical hole.

In this case, as shown in the figures, the pump openings 22b are offset to the inner diameter side relative to the pump plunger holes 22a. Because the pump openings 22b are offset, the distance r2 (FIG. 9) from the center axis of the pump cylinder 22 to the center of the pump opening 22b is less than the distance r1 from the center axis of the pump cylinder 22 to the center of the pump plunger hole 22a. Accordingly, the pump openings 22b are eccentric to the inner diameter side by a distance e1, which is the difference between r1 and r2.

Similarly, the motor openings 32b are also each formed in a cylindrical shape, and are located eccentric to the inner diameter side relative to the motor plunger holes 32a. Specifically, the distance r4 from the center axis of the motor cylinder 32 to the center of the motor opening 32b is smaller than the distance r3 from the center axis of the motor cylinder 32 to the center of the motor plunger hole 32a. As a result, it will be seen that the motor openings 32b are eccentric to the inner diameter side by a distance e2, given by the difference between r3 and r4.

As has been described above, when the pump casing 20 is driven to rotate by receiving the rotational drive force of the engine E, and the hydraulic fluid is discharged from the hydraulic pump P into the outside passage 57 and fed to the hydraulic motor M to rotate the motor cylinder 32, the pump cylinder 22 and the motor cylinder 32 are rotated as one body with the transmission output shaft 6.

Therefore, the hydraulic fluid present in the pump oil chambers 23a and the motor oil chambers 33a receives a centrifugal force corresponding to the rotating speed, and, if air (in the form of bubbles) has been mixed into the hydraulic fluid, the air collects on the inner diameter side in the pump oil chambers 23a and the motor oil chambers 33a, because the air is lower in specific gravity than the oil.

Here, since the pump openings 22b and the motor openings 32b are eccentric to the inner diameter side relative to the pump plunger holes 22a and the motor plunger holes 32a, any air collecting on the inner diameter side, under the centrifugal force, is smoothly discharged through the pump openings 22b and the motor openings 32b into the closed hydraulic circuit (the inside passage 56 and the outside passage 57). Therefore, air is substantially prevented from remaining in the pump oil chambers 23a and the motor oil chambers 33a, and pump and motor volumetric efficiencies are enhanced.

Figure 12:
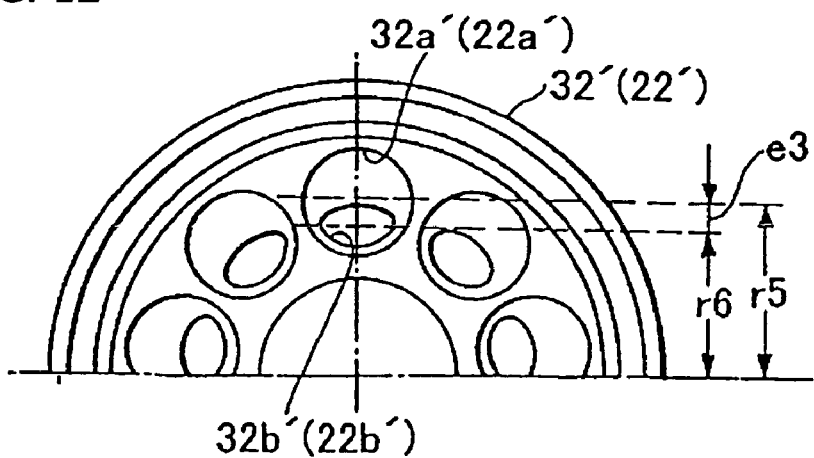
FIG. 12 is a side view showing a modified embodiment of the motor cylinder of the hydraulic continuously variable transmission according to an embodiment of the present invention.

In addition, as shown in FIG. 12, the pump openings 22b' and the motor openings 32b' may each be formed in an elliptic shape, with a minor axis in a radial direction. This ensures that the pump openings 22b' and the motor openings 32b' can be made eccentric to the inner diameter side relative to the pump plunger holes 22a' and the motor plunger holes 32a' while securing the same opening area as above, and air can be discharged more smoothly.

As has been described above, according to the present invention, the hydraulic continuously variable transmission includes the axial plunger pump and the axial plunger motor connected to each other through the closed hydraulic circuit. The pump cylinder has the pump discharge openings formed therein for discharging the hydraulic fluid pushed out attendant on sliding movements of the pump plungers in the pump plunger holes. The pump discharge openings are provided at end portions of the pump plunger holes opposite end faces of the pump plungers, and the pump discharge openings are smaller than the pump plunger holes and offset to the side of the rotational axis of the pump cylinder.

Therefore, any mixed air, collecting on the inner diameter side in the pump plunger holes under the centrifugal force exerted on rotation of the pump cylinder, is smoothly discharged through the pump discharge openings. The air is substantially prevented from remaining in the pump plunger holes, and the pump compression efficiency (volumetric efficiency) can be maintained.

In addition, while the pump discharge openings may each be formed in a circular shape, the pump discharge openings may, alternatively, be formed in an elliptic shape with a minor axis in the radial direction of the pump cylinder. Where these elliptic discharge openings are used, the center axes of the elliptic shapes are offset to the side of the rotational axis of the pump cylinder relative to the center axes of the pump plunger holes.

With the pump discharge openings thus each formed in an elliptic shape, it is possible to provide the pump openings further on the inner diameter side while securing the opening area, to substantially prevent air from remaining in the pump plunger holes, and to further enhance the pump compression efficiency.

In addition, it is preferable that the motor discharge openings for discharging the hydraulic fluid pushed out attendant on sliding movements of the motor plungers in the motor plunger holes are provided at end portions of the motor plunger holes opposite end faces of the motor plungers, and that the motor discharge openings are smaller than the motor plunger holes and offset to the side of the rotational axis of the motor cylinder.

This makes it possible to prevent air from remaining in the motor plunger holes, and to maintain motor compression efficiency.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

The pump casing 20 is rotatably supported on the transmission output shaft 6 through a bearing 8a, and is supported by another bearing 8b to be rotatable relative to the transmission housing HSG. The pump swash plate member 21 is supported by bearings 24 and 21b to be rotatable about a swash plate axis, inclined at the predetermined angle relative to the pump casing 20. The pump cyclinder 22 is supported by a bearing 22c to be a coaxial with, and rotatable relative to the pump casing 20.

The hydraulic motor M also includes a motor swash plate member 31 rotatably supported inside the motor pivot member 35 by bearings 34 and 31b, and a plurality of motor plungers 33 slidably disposed in a plurality of motor plunger holes 32a, and formed to extend in the axial direction in an annular layout surrounding the center axis of the motor cylinder 32. In addition, the motor cylinder 32 is rotatably supported, at an outer circumferential portion thereof, on the motor casing 30 through a bearing 32c.

Having thus, described the invention, what is claimed is:

1. A hydraulic continuously variable transmission comprising:
   a transmission casing;
   an axial plunger pump comprising:
      a pump cylinder rotatably supported in said casing and provided with a plurality of pump plunger holes arranged in an annular layout surrounding the rotational axis thereof and penetrating therethrough in the axial direction, and
      a plurality of pump plungers slidably fitted in said pump plunger holes;
   an axial plunger motor, comprising:
      a motor cylinder rotatably supporting on said casing and provided with a plurality of motor plunger holes arranged in an annular layout surrounding the rotational axis thereof and penetrating therethrough in the axial direction, and
      a plurality of motor plungers slidably fitted in said motor plunger holes; and
   a closed hydraulic circuit connecting a pump discharge port and a pump suction port of said axial plunger pump, respectively, to a motor suction port and a motor discharge port of said axial plunger motor;
   wherein pump discharge openings are provided at end portions of said pump plunger holes opposite end faces of said pump plungers, for discharging a hydraulic fluid pushed out attendant on sliding movements of said pump plungers in said pump plunger holes,
   each of said pump plunger holes being axially aligned with a corresponding one of said motor plunger holes, and
   said pump discharge openings are smaller than said pump plunger holes and are offset from the center axes of said pump plunger holes toward the rotational axis of said pump cylinder.

2. The hydraulic continuously variable transmission as set forth in claim 1, wherein said pump discharge openings are each formed in a circular shape.

3. The hydraulic continuously variable transmission as set forth in claim 1, wherein motor discharge openings for discharging a hydraulic fluid pushed out attendant on sliding movements of said motor plungers in said motor plunger holes are provided at end portions of said motor plunger holes opposite end faces of said motor plungers; and said motor discharge openings are smaller than said motor plunger holes and are offset from the center axes of said motor plunger holes toward the rotational axis of said motor cylinder.

4. A hydraulic continuously variable transmission comprising:
   a transmission casing;
   an axial plunger pump comprising:
      a pump cylinder rotatably supported in said casing and provided with a plurality of pump plunger holes arranged in an annular layout surrounding the rotational axis thereof and penetrating therethrough in the axial direction, and
      a plurality of pump plungers slidably fitted in said pump plunger holes;
   an axial plunger motor, comprising:
      a motor cylinder rotatably supporting on said casing and provided with a plurality of motor plunger holes arranged in an annular layout surrounding the rotational axis thereof and penetrating therethrough in the axial direction, and
      a plurality of motor plungers slidably fitted in said motor plunger holes; and
   a closed hydraulic circuit connecting a pump discharge port and a pump suction port of said axial plunger pump, respectively, to a motor suction port and a motor discharge port of said axial plunger motor;
   wherein pump discharge openings are provided at end portions of said pump plunger holes opposite end faces of said pump plungers, for discharging a hydraulic fluid pushed out attendant on sliding movements of said pump plungers in said pump plunger holes,
   said pump discharge openings are smaller than said pump plunger holes and are offset from the center axes of said pump plunger holes toward the rotational axis of said pump cylinder, and said pump discharge openings are each formed in an elliptic shape with a minor axis in a radial direction of said pump cylinder.

5. A hydraulic continuously variable transmission, comprising:
   a hollow transmission housing;
   a motor casing disposed within said transmission housing;
   a motor pivot member supported by said motor casing;
   a swash plate plunger pump disposed within said housing and comprising a pump swash plate and a pump cylinder having a plurality of pump plunger holes formed therein to slidably receive a plurality of pump plungers;
   a swash plate plunger motor rotatably supported on said motor pivot member and comprising a motor swash plate and a motor cylinder having a plurality of motor plunger holes formed therein to slidably receive a plurality of motor plungers; and
   an output shaft extending through and supporting said pump cylinder and said motor cylinder, said output shaft being rotatably supported in said housing through a plurality of rotatable bearings;
   wherein pump discharge openings are provided at end portions of said pump plunger holes opposite end faces of said pump plungers, for discharging a hydraulic fluid pushed out attendant on sliding movements of said pump plungers in said pump plunger holes, and said pump discharge openings are smaller than said pump plunger holes and are offset from the center axes of said pump plunger holes toward the rotational axis of said pump cylinder.

6. The hydraulic continuously variable transmission as set forth in claim 5, wherein said pump discharge openings are each formed in a circular shape.

7. The hydraulic continuously variable transmission as set forth in claim 5, wherein motor discharge openings for discharging a hydraulic fluid pushed out attendant on sliding movements of said motor plungers in said motor plunger holes are provided at end portions of said motor plunger holes opposite end faces of said motor plungers; and said motor discharge openings are smaller than said motor plunger holes and are offset from the center axes of said motor plunger holes toward the rotational axis of said motor cylinder.

8. A hydraulic continuously variable transmission, comprising:
- a hollow transmission housing;
- a motor casing disposed within said transmission housing;
- a motor pivot member supported by said motor casing;
- a swash plate plunger pump disposed within said housing and comprising a pump swash plate and a pump cylinder having a plurality of pump plunger holes formed therein to slidably receive a plurality of pump plungers;
- a swash plate plunger motor rotatably supported on said motor pivot member and comprising a motor swash plate and a motor cylinder having a plurality of motor plunger holes formed therein to slidably receive a plurality of motor plungers; and
- an output shaft extending through and supporting said pump cylinder and said motor cylinder, said output shaft being rotatably supported in said housing through a plurality of rotatable bearings;

wherein pump discharge openings are provided at end portions of said pump plunger holes opposite end faces of said pump plungers, for discharging a hydraulic fluid pushed out attendant on sliding movements of said pump plungers in said pump plunger holes, said pump discharge openings are smaller than said pump plunger holes and are offset from the center axes of said pump plunger holes toward the rotational axis of said pump cylinder, and said pump discharge openings are each formed in an elliptic shape with a minor axis in a radial direction of said pump cylinder.

* * * * *